United States Patent
Cho et al.

(10) Patent No.: US 9,655,155 B2
(45) Date of Patent: May 16, 2017

(54) METHOD AND APPARATUS FOR ESTABLISHING DEVICE-TO-DEVICE CONNECTION IN WIRELESS COMMUNICATION SYSTEM

(71) Applicant: LG ELECTRONICS INC., Seoul (KR)

(72) Inventors: Heejeong Cho, Anyang-si (KR); Eunjong Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/395,778

(22) PCT Filed: Feb. 6, 2013

(86) PCT No.: PCT/KR2013/000944
§ 371 (c)(1),
(2) Date: Oct. 20, 2014

(87) PCT Pub. No.: WO2013/162162
PCT Pub. Date: Oct. 31, 2013

(65) Prior Publication Data
US 2015/0117293 A1    Apr. 30, 2015

Related U.S. Application Data

(60) Provisional application No. 61/639,094, filed on Apr. 27, 2012.

(51) Int. Cl.
*H04W 4/00* (2009.01)
*H04W 76/02* (2009.01)
(Continued)

(52) U.S. Cl.
CPC ....... *H04W 76/023* (2013.01); *H04W 76/002* (2013.01); *H04W 76/021* (2013.01); *H04W 28/18* (2013.01); *H04W 92/18* (2013.01)

(58) Field of Classification Search
CPC ... H04W 76/00; H04W 76/02; H04W 76/002; H04W 76/021
(Continued)

(56) References Cited

U.S. PATENT DOCUMENTS

2003/0099221 A1* 5/2003 Rhee ............... H04L 12/12
370/338
2008/0133757 A1 6/2008 Etelapera
(Continued)

FOREIGN PATENT DOCUMENTS

JP   2011-097185   5/2011
WO   2011/109941   9/2011

OTHER PUBLICATIONS

PCT International Application No. PCT/KR2013/000944, Written Opinion of the International Searching Authority dated May 27, 2013, 1 page.
(Continued)

*Primary Examiner* — Farah Faroul
(74) *Attorney, Agent, or Firm* — Lee Hong Degerman Kang & Waimey (57) ABSTRACT

A method and apparatus for establishing a device-to-device (D2D) connection in a wireless communication system is provided. A network transmits a connection establishment request message to request of the D2D connection establishment to a first device and a second device, receives a connection establishment response message indicating whether to accept the request of the D2D connection establishment from the first device and the second device, and transmits a connection establishment confirm message to
(Continued)

confirm the D2D connection establishment to a first device and a second device. The connection establishment request message includes at least one of a connection establishment type, a quality of (QoS) parameter for the D2D connection, and security information.

13 Claims, 8 Drawing Sheets

(51) Int. Cl.
 *H04W 76/00* (2009.01)
 *H04W 28/18* (2009.01)
 *H04W 92/18* (2009.01)

(58) Field of Classification Search
 USPC .................................................. 370/252, 329
 See application file for complete search history.

(56) References Cited

U.S. PATENT DOCUMENTS

| | | | | |
|---|---|---|---|---|
| 2009/0323659 | A1* | 12/2009 | Zhang | H04W 76/023 370/338 |
| 2010/0009675 | A1 | 1/2010 | Wijting et al. | |
| 2010/0040029 | A1 | 2/2010 | Doppler et al. | |
| 2011/0098043 | A1 | 4/2011 | Yu et al. | |
| 2011/0306349 | A1* | 12/2011 | Hakola | H04W 28/04 455/450 |
| 2012/0093098 | A1* | 4/2012 | Charbit | H04W 72/04 370/329 |
| 2012/0207100 | A1* | 8/2012 | Hakola | H04W 76/023 370/329 |
| 2013/0064138 | A1* | 3/2013 | Hakola | H04L 67/16 370/255 |
| 2013/0102314 | A1* | 4/2013 | Koskela | H04W 36/0072 455/436 |
| 2013/0122918 | A1* | 5/2013 | Boley | H04W 76/046 455/450 |
| 2013/0188552 | A1* | 7/2013 | Kazmi | H04L 5/001 370/315 |
| 2013/0250771 | A1* | 9/2013 | Yu | H04W 76/023 370/241 |
| 2013/0322388 | A1* | 12/2013 | Ahn | H04W 76/023 370/329 |
| 2014/0010209 | A1* | 1/2014 | Hakola | H04W 24/02 370/336 |
| 2014/0023008 | A1* | 1/2014 | Ahn | H04W 76/023 370/329 |
| 2014/0219261 | A1* | 8/2014 | Johnsson | H04W 76/023 370/338 |
| 2015/0038135 | A1* | 2/2015 | Lu | H04L 5/005 455/426.1 |

OTHER PUBLICATIONS

European Patent Office Application Serial No. 13782243.3, Search Report dated Nov. 17, 2015, 7 pages.

* cited by examiner

METHOD AND APPARATUS FOR ESTABLISHING DEVICE-TO-DEVICE CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2013/000944, filed on Feb. 6, 2013, which claims the benefit of U.S. Provisional Application Ser. No. 61/639,094, filed on Apr. 27, 2012, the contents of which are all hereby incorporated by reference herein in their entirety.

BACKGROUND OF THE INVENTION

Field of the Invention

The present invention relates to wireless communications, and more particularly, to a method and apparatus for establishing a device-to-device (D2D) connection in a wireless communication system.

Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

Various scenarios may exist to establish the D2D connection. There may be a D2D connection scenario on the basis of whether the D2D connection establishment is initiated by the BS or each device. In addition, there may be a D2D connection scenario on the basis of whether information regarding another device neighboring to a specific device is known to the BS or is known to the specific device.

If the D2D connection establishment is initiated by the BS, an effective D2D connection establishment method is required.

SUMMARY OF THE INVENTION

The present invention provides a method and apparatus for establishing a device to device (D2D) connection in a wireless communication system. The present invention provides a method of establishing a D2D connection when a network knows information on devices neighboring to a specific device in a wireless communication system.

In an aspect, a method for establishing, by a network, a device-to-device (D2D) connection in a wireless communication system is provided. The method includes determining whether to establish the D2D connection between devices based on at least one of a proximity between the devices, a presence of data to be transmitted by the devices, and a preference for the D2D connection of the devices, transmitting a connection establishment request message to request of the D2D connection establishment to a first device and a second device, the connection establishment request message including at least one of a connection establishment type, a quality of service (QoS) parameter for the D2D connection, and security information, receiving a connection establishment response message indicating whether to accept the request of the D2D connection establishment from the first device and the second device, and transmitting a connection establishment confirm message to confirm the D2D connection establishment to a first device and a second device.

In another aspect, a method for transmitting, by a first device, data in a wireless communication system is provided. The method includes receiving a connection establishment request message to request of a device-to-device (D2D) connection establishment from a network, the connection establishment request message including at least one of a connection establishment type, a quality of service (QoS) parameter for the D2D connection, and security information, transmitting a connection establishment response message indicating whether to accept the request of the D2D connection establishment to the network, receiving a connection establishment confirm message to confirm the D2D connection establishment from the network, allocating resources for transmission of data to the second device, and transmitting the data to the second device.

In another aspect a method for establishing, by a network, a device-to-device (D2D) connection in a wireless communication system is provided. The method includes determining whether to establish the D2D connection between devices based on at least one of a proximity between the devices, a presence of data to be transmitted by the devices, and a preference for the D2D connection of the devices, transmitting a D2D broadcast configuration message to request of the D2D connection establishment to a plurality of source devices, the D2D broadcast configuration message including at least one of information on the plurality of source devices and a target device, D2D connection information pre-established for the target device, a quality of service (QoS) parameter for the D2D connection, security information, and a D2D identifier, and receiving a connection establishment setup report message including information on the plurality of source devices and the target device from the plurality of source devices.

A D2D connection is efficiently established.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
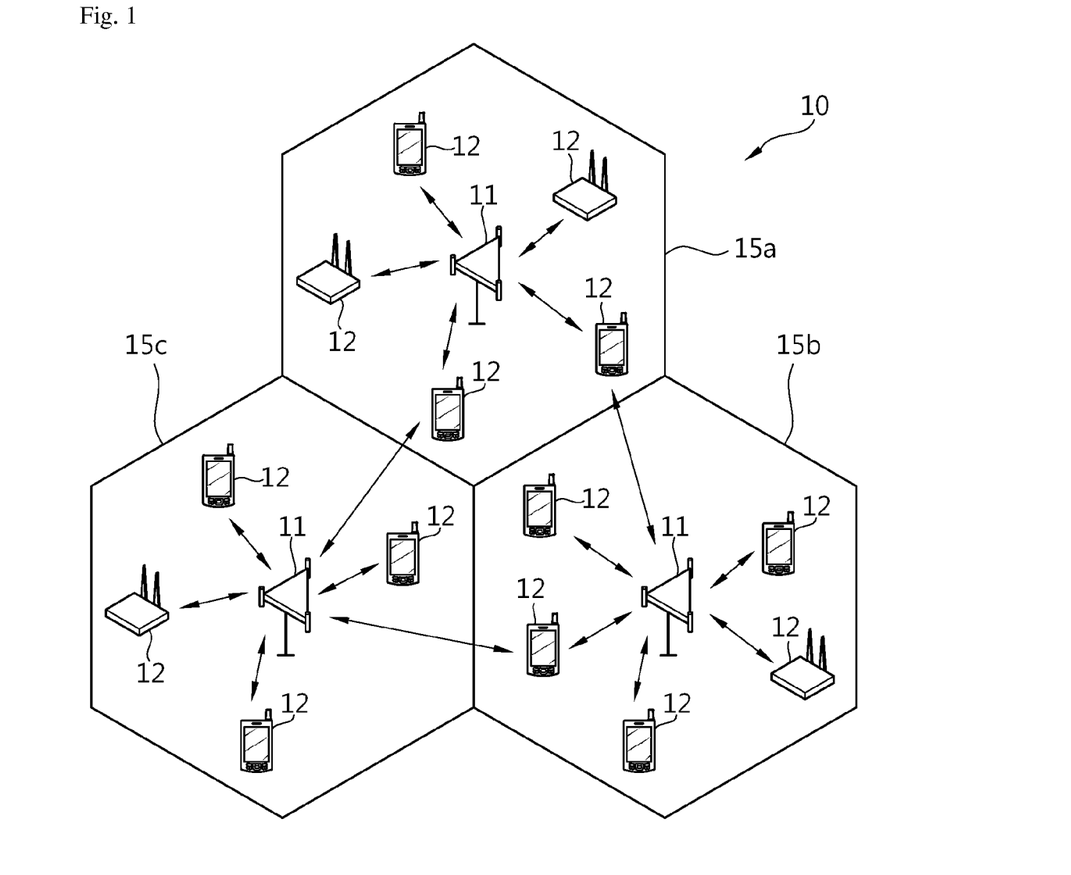
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

A device-to-device (D2D) connection technique can be employed in a wireless communication system. The D2D connection technique refers to a technique for transmitting and receiving data not via a BS since devices such as a user equipment (UE) or the like are connected to each other. There may be various scenarios for establishing the D2D connection.

Figure 2:
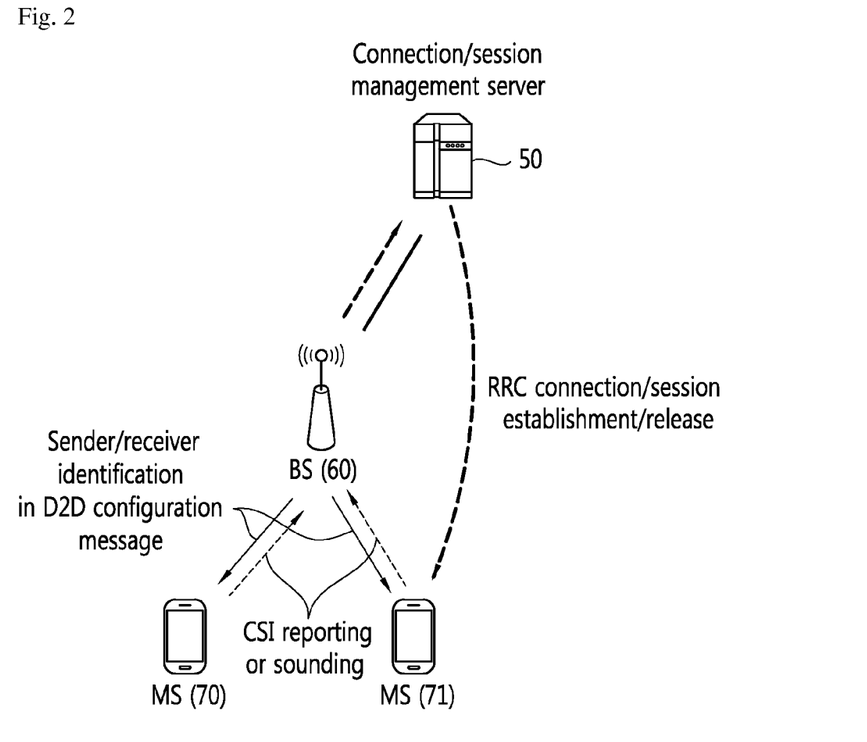
FIG. 2 shows an example of a D2D connection scenario according to an embodiment of the present invention.

FIG. 2 shows an example of a D2D connection scenario according to an embodiment of the present invention.

FIG. 2 shows an example of a network-initiated D2D connection establishment. A network is aware of information on other devices neighboring to a specific device, and the specific device cannot know information on other neighbor devices. Therefore, in this scenario, only the network can initiate the D2D connection establishment, and each device cannot initiate the D2D connection establishment. If an uplink (UL) packet transmitted from each device is received, the network can perform a D2D connection establishment procedure according to a destination of the packet, a location of the destination, or the like. The network can determine whether devices are neighboring to each other by using a location of each device, routing information, etc.

Referring to FIG. 2, each of devices 70 and 71 periodically performs channel state information (CSI) reporting or sounding with respect to a BS 60. The BS 60 can request a D2D connection establishment to each of the devices 70 and 71 by determining a proximity between the devices 70 and 71 by the use of location information of the devices 70 and 71, a presence of data to be transmitted between the devices 70 and 71, a preference for a D2D connection of each of the devices 70 and 71, etc. The network and each of the devices 70 and 71 can pre-negotiate about whether a D2D connection is preferred or a base station to device (B2D) connection is preferred according to an application type or a data characteristic.

The BS 60 transmits a D2D configuration message to each of the devices 70 and 71 to establish the D2D connection. In this case, the D2D configuration message may include an identifier of each of the devices 70 and 71. If the D2D connection is established, the BS 60 reports this to a connection/session management server 50, and the connection/session management server 50 instructs each of the devices 70 and 71 to establish/release a radio resource control (RRC) connection/session.

After the D2D connection establishment is complete, each of the devices 70 and 71 can transmit and receive data directly, not via the BS 60. In this case, a D2D resource used by each of the devices 70 and 71 to directly transmit and receive the data may be independent of or shared with a B2D resource for data transmission and reception between the existing each of the devices 70 and 71 and the BS 60.

Hereinafter, a D2D connection establishment method will be described according to an embodiment of the present invention.

Figure 3:
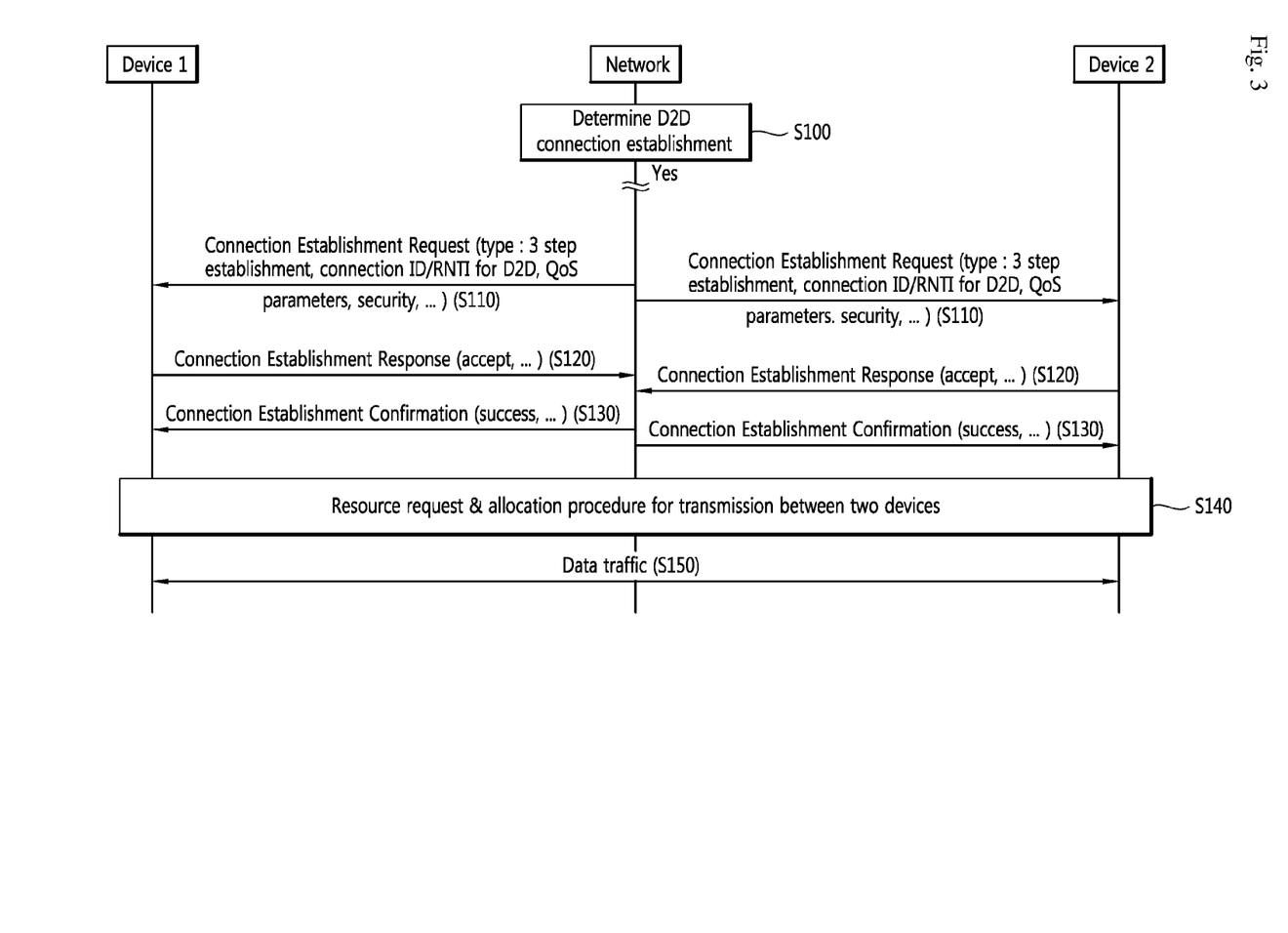
FIG. 3 shows an example of a D2D connection establishment method according to an embodiment of the present invention.

FIG. 3 shows an example of a D2D connection establishment method according to an embodiment of the present invention. The embodiment of FIG. 3 shows a case in which, when a D2D connection establishment is initiated by a network, the D2D connection establishment procedure is achieved in three steps, and a message for the D2D connection establishment is transmitted in a unicast manner to devices to which the D2D connection establishment is targeted.

Referring to FIG. 3, the network determines whether a D2D connection is established between a device 1 and a device 2 in step S100. The network may determine a proximity between the devices 1 and 2 by the use of location information of the devices 1 and 2, a presence of data to be transmitted between the devices 1 and 2, a preference for a D2D connection of each of the devices 1 and 2, etc.

If the network determines to establish the D2D connection between the device 1 and the device 2, the network transmits a connection establishment request message to the devices 1 and 2 in a unicast manner in step S110. The connection establishment request message may include a connection establishment type, information of each device, a quality of service (QoS) parameter for the D2D connection, security information, a D2D identifier, etc. The connection establishment type indicates a 3-step D2D connection establishment procedure. The information of each device indicates information of devices to which the D2D connection establishment is targeted. The information of each device may be any one of each device's cell radio network temporary identifier (C-RNTI) assigned by the network, a station identifier (STID), etc.

The D2D identifier indicates an identifier of the D2D connection to be established between the device 1 and the device 2 by the network. The D2D identifier may be a link level D2D identifier. The link level D2D identifier is an identifier assigned to a connection for recognizing each UE, and is an identifier assigned to a physical connection between the devices. Only one logical link may exist between the devices. Therefore, the link level D2D identifier may be unique in a specific area. In IEEE 802.16, the link level D2D identifier may be an STID. In 3GPP LTE-A, the link level D2D identifier may be an RNTI. Alternatively, the D2D identifier may be a connection/flow level D2D identifier. The connection/flow level D2D identifier is an identifier assigned to one or more service flows that can be established between the devices, and is an identifier assigned to a logical connection between the devices. A plurality of connections or flows each of which has a different property may exist between the devices. In IEEE 802.16, the connection/flow level D2D identifier may be a flow ID or connection ID in a media access control (MAC) layer. In 3GPP LTE-A, the connection/flow level D2D identifier may be a logical channel ID (LCID) in an MAC layer or a distributed resource block (DRB) identity in a radio link control (RLC) layer. Meanwhile, the D2D identifier may also be used in resource allocation for data transmission and reception after the D2D connection establishment is complete.

In step S120, the devices 1 and 2 transmit a connection establishment response message to the network. The connection establishment response message indicates whether to accept or deny a D2D connection establishment request of the network. The embodiment of FIG. 3 shows a case in which the devices 1 and 2 accept the D2D connection establishment request of the network.

In step S130, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 3, since the devices 1 and 2 accept the D2D connection establishment request, the connection establishment confirm message indicates a success of the D2D connection establishment. The connection establishment confirm message may be transmitted to each of the devices 1 and 2 in a unicast manner, or may be transmitted to the devices 1 and 2 in a multicast manner by using the D2D identifier transmitted through the connection establishment request message.

In step S140, the devices 1 and 2 perform a resource request and allocation procedure for data transmission. The D2D identifier transmitted through the connection establishment request message may be used in resource allocation. If the resource allocation is complete between the device 1 and the device 2, the devices 1 and 2 transmit and receive traffic data in step S150.

Figure 4:
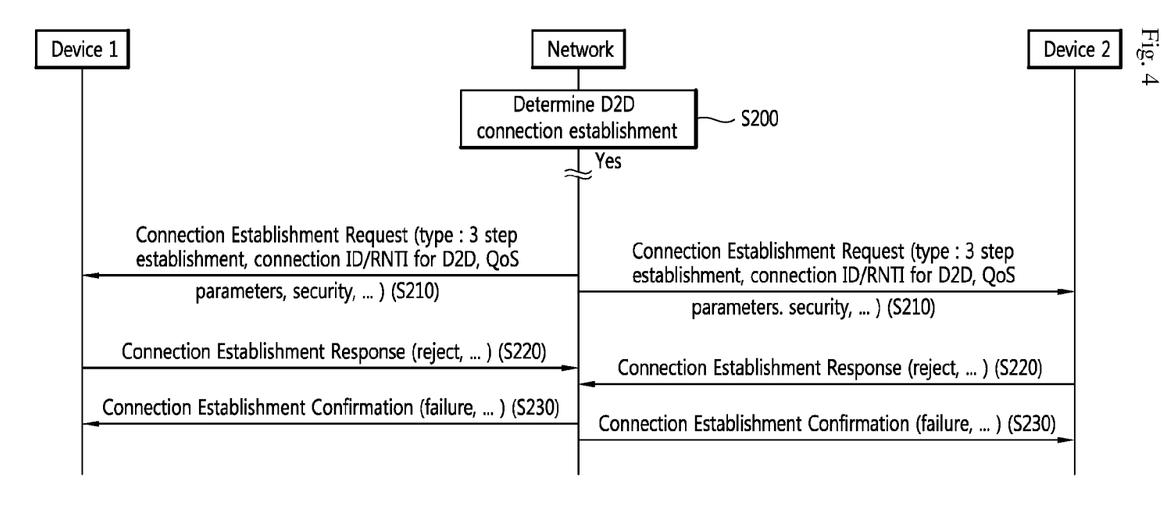
FIG. 4 shows another example of a D2D connection establishment method according to an embodiment of the present invention.

FIG. 4 shows another example of a D2D connection establishment method according to an embodiment of the present invention. The embodiment of FIG. 4 shows a case in which, when a D2D connection establishment is initiated by a network, the D2D connection establishment procedure is achieved in three steps, and a message for the D2D connection establishment is transmitted in a unicast manner to devices to which the D2D connection establishment is targeted.

Referring to FIG. 4, the network determines whether a D2D connection is established between a device 1 and a device 2 in step S200. If the network determines to establish the D2D connection between the device 1 and the device 2, the network transmits a connection establishment request message to the devices 1 and 2 in a unicast manner in step S210. The connection establishment request message may include a connection establishment type, information of each device, a QoS parameter for the D2D connection, security information, a D2D identifier, etc.

In step S220, the devices 1 and 2 transmit a connection establishment response message to the network. The connection establishment response message indicates whether to accept or deny a D2D connection establishment request of the network. The embodiment of FIG. 4 shows a case in which the devices 1 and 2 deny the D2D connection establishment request of the network.

In step S230, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 4, since the devices 1 and 2 deny the D2D connection establishment request, the connection establishment confirm message indicates a failure of the D2D connection establishment. The connection establishment confirm message may be transmitted to each of the devices 1 and 2 in a unicast manner, or may be transmitted to the devices 1 and 2 in a multicast manner by using the D2D identifier transmitted through the connection establishment request message.

Figure 5:
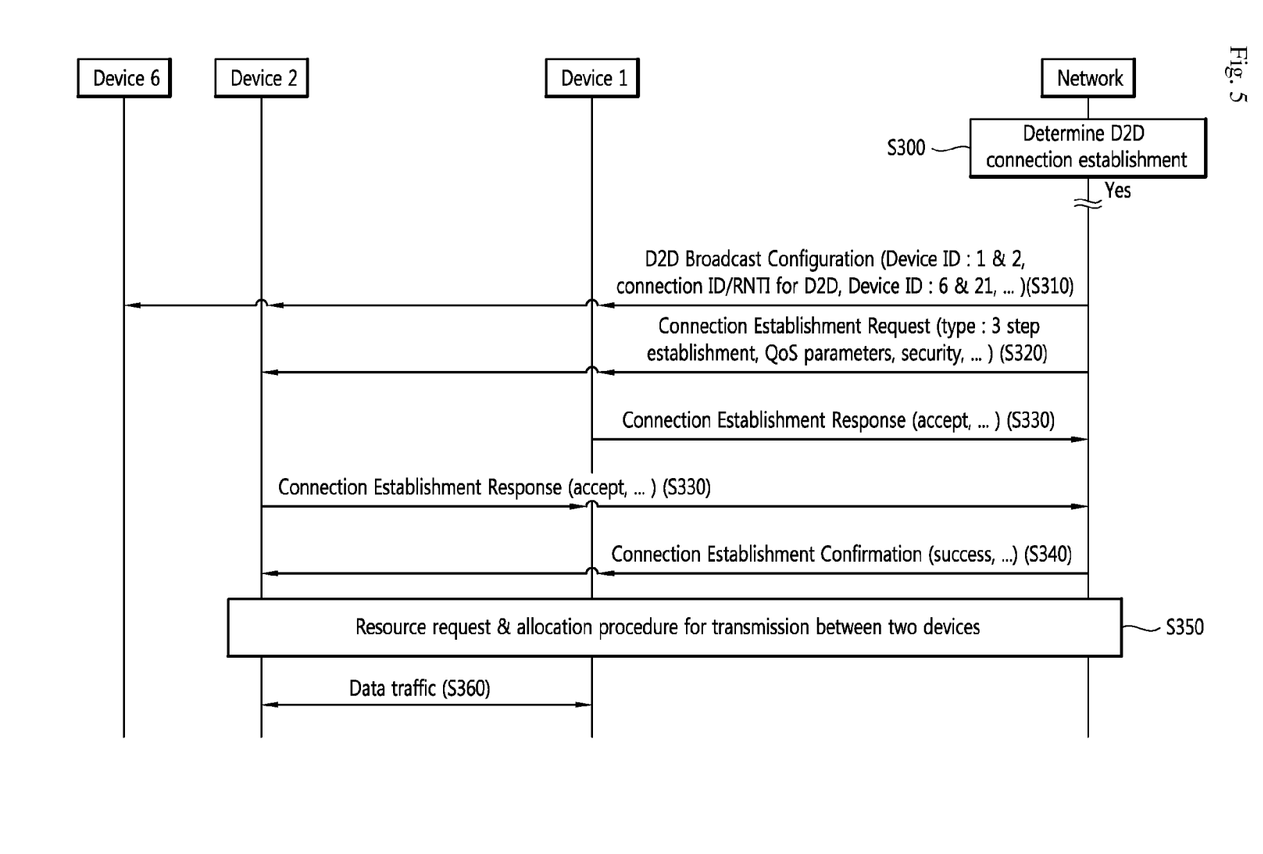
FIG. 5 shows another example of a D2D connection establishment method according to an embodiment of the present invention.

FIG. 5 shows another example of a D2D connection establishment method according to an embodiment of the present invention. The embodiment of FIG. 5 shows a case in which, when a D2D connection establishment is initiated by a network, the D2D connection establishment procedure is achieved in three steps, and a message for the D2D connection establishment is transmitted in a broadcast or multicast manner to devices to which the D2D connection establishment is targeted.

Referring to FIG. 5, the network determines whether a D2D connection is established between devices in step S300. The network can determine whether the D2D connection is established between the devices on the basis of a proximity between the devices by the use of location information of the devices, a presence of data to be transmitted and received between the devices, a preference for the D2D connection of the devices, etc.

In step S310, the network transmits a D2D broadcast configuration message. The D2D broadcast configuration message may be transmitted in a broadcast manner. That is, the D2D broadcast configuration message can be transmitted not only to devices which are considered by the network as devices to which the D2D connection establishment is targeted but also to all neighbor devices. The D2D broadcast configuration message may include information of each device, a D2D identifier, etc. The information of each device indicates information of devices to which the D2D connection establishment is targeted. The information of each device may be any one of each device's C-RNTI assigned by the network, an STID, etc. The D2D identifier indicates an identifier for the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

In step S320, the network transmits a connection establishment request message to the devices 1 and 2. The connection establishment request message may include a connection establishment type, a QoS parameter for the D2D connection, security information, etc. The connection establishment type indicates a 3-step D2D connection establishment procedure. The connection establishment request message may be transmitted to the devices 1 and 2 in a multicast manner by using the D2D identifier transmitted through the D2D broadcast configuration message.

In step S330, the devices 1 and 2 transmit a connection establishment response message to the network. The connection establishment response message indicates whether to accept or deny a D2D connection establishment request of the network. The embodiment of FIG. 5 shows a case in which the devices 1 and 2 accept the D2D connection establishment request of the network.

In step S340, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 5, since the devices 1 and 2 accept the D2D connection establishment request, the connection establishment confirm message indicates a success of the D2D connection establishment. The connection establishment confirm message can be transmitted to the devices 1 and 2 in a multicast manner by using the D2D identifier transmitted through the D2D broadcast configuration message.

In step S350, the devices 1 and 2 perform a resource request and allocation procedure for data transmission. The D2D identifier transmitted through the D2D broadcast configuration message may be used in resource allocation. If the resource allocation is complete between the device 1 and the device 2, the devices 1 and 2 transmit and receive traffic data in step S360.

Figure 6:
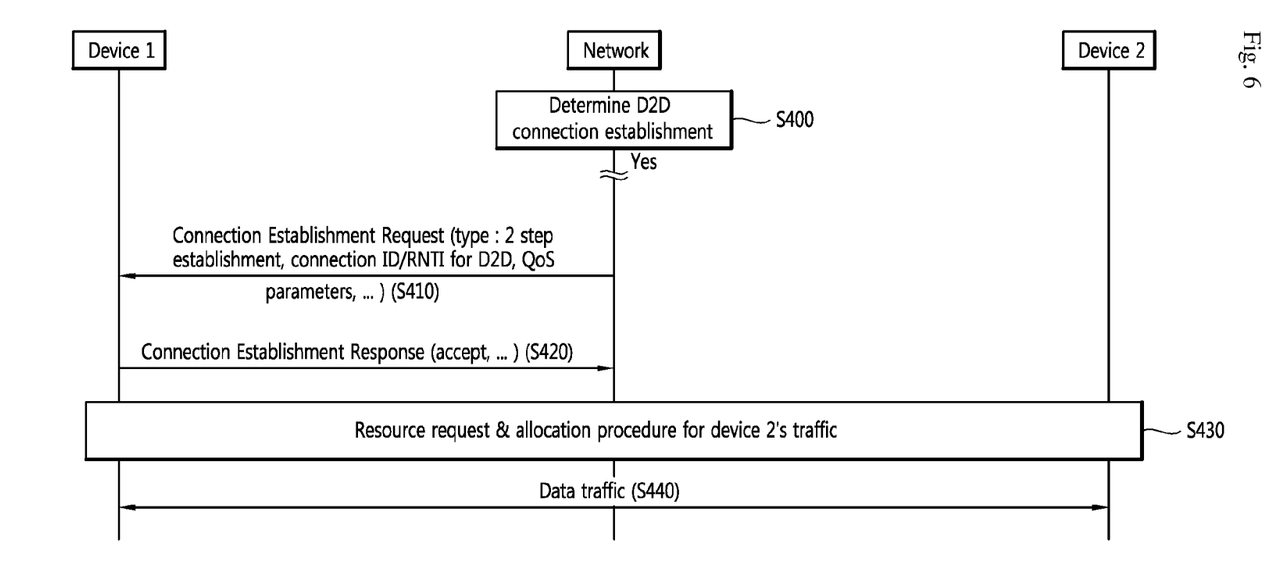
FIG. 6 shows another example of a D2D connection establishment method according to an embodiment of the present invention.

FIG. 6 shows another example of a D2D connection establishment method according to an embodiment of the present invention.

The embodiment of FIG. 6 shows a case in which, when a D2D connection establishment is initiated by a network, the D2D connection establishment procedure is achieved in two steps. A D2D connection can be established between a device 1 and a device 2 in a state where the device 2 has already transmitted data to many random devices in a neighbor area. The device 2 may be a device used in a business (e.g., a shop, a restaurant, etc.). The device 2 is in a state in which a D2D connection has already been established to the many random devices. In this case, the D2D connection can be established when the device 1 accepts a D2D connection establishment request of the network. That is, since a connection establishment confirm procedure is not required, the D2D connection establishment procedure can be performed in two steps.

Referring to FIG. 6, the network determines whether the D2D connection is established between the device 1 and the device 2 in step S400. The network may determine a proximity between the devices 1 and 2 by the use of location information of the devices 1 and 2, a presence of data to be transmitted between the devices 1 and 2, a preference for a D2D connection of each of the devices 1 and 2, etc.

If the network determines to establish the D2D connection between the device 1 and the device 2, the network transmits a connection establishment request message to the device 1 in step S410. The connection establishment request message may include a connection establishment type, information of each device, information on a D2D connection pre-established for traffic of the device 2, a QoS parameter for the D2D connection, security information, a D2D identifier, etc. The connection establishment type indicates a 2-step D2D connection establishment procedure. The information of each device indicates information of devices to which the D2D connection establishment is targeted. The information of each device may be any one of each device's C-RNTI assigned by the network, an STID, etc. The D2D identifier indicates an identifier for the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

In step S420, the device 1 transmits a connection establishment response message to the network. The connection establishment response message indicates whether to accept or deny a D2D connection establishment request of the network. The embodiment of FIG. 6 shows a case in which the device 1 accepts the D2D connection establishment request of the network.

In step S430, the devices 1 and 2 perform a resource request and allocation procedure for data transmission of the device 2. The D2D identifier transmitted through the connection establishment request message may be used in resource allocation. If the resource allocation is complete between the device 1 and the device 2, the device 1 and the device 2 receive traffic data in step S440.

Figure 7:
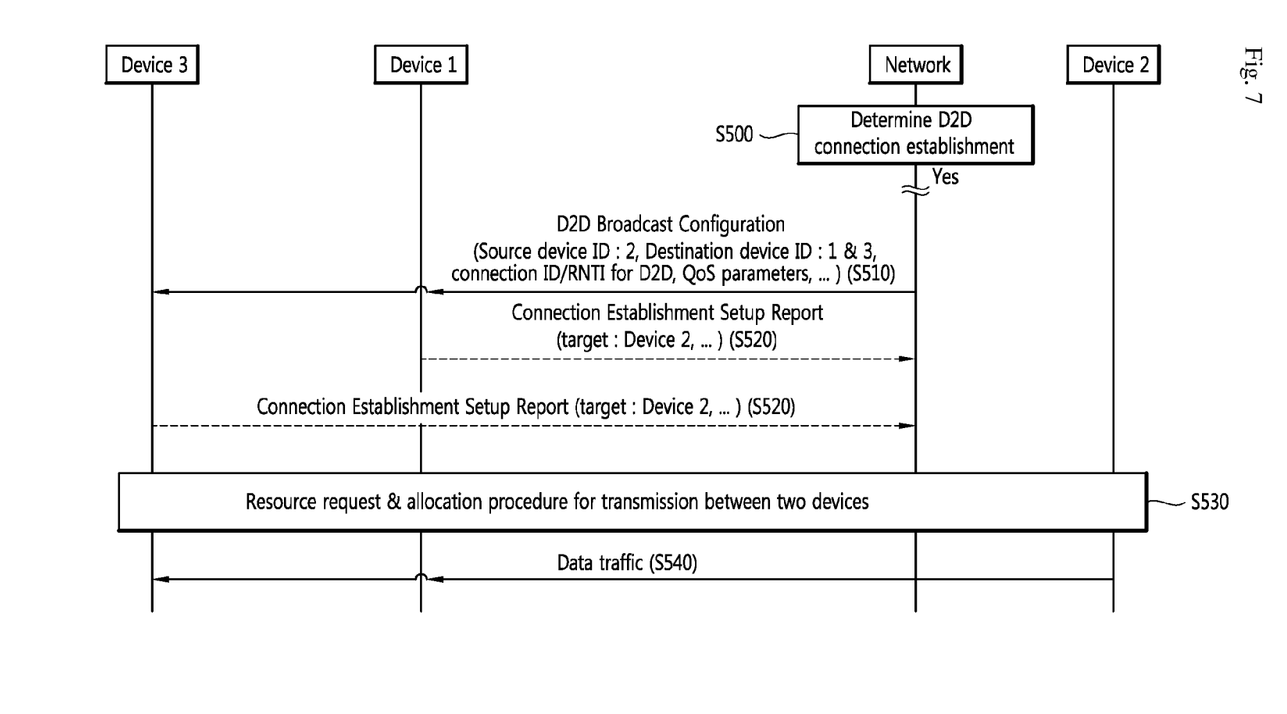
FIG. 7 shows another example of a D2D connection establishment method according to an embodiment of the present invention.

FIG. 7 shows another example of a D2D connection establishment method according to an embodiment of the present invention. The embodiment of FIG. 7 shows a case in which, when a D2D connection establishment is initiated by a network, the D2D connection establishment procedure is achieved in two steps.

Referring to FIG. 7, the network determines whether a D2D connection is established between devices in step S500. The network can determine whether the D2D connection is established between the devices on the basis of a proximity between the devices by the use of location information of the devices, a presence of data to be transmitted and received between the devices, a preference for the D2D connection of the devices, etc.

In step S510, the network transmits a D2D broadcast configuration message. The D2D broadcast configuration message may be transmitted in a broadcast manner. The D2D broadcast configuration message may include information of each device, information on a D2D connection pre-established for traffic of the device 2, a QoS parameter for the D2D connection, security information, a D2D identifier, etc. The information of each device indicates information of devices to which the D2D connection establishment is targeted. The information of each device may an identifier such as any one of each device's C-RNTI assigned by the network, an STID, etc. The information of each device may indicate that a source device is a device 2 and a destination device is a device 1 and a device 3. The D2D identifier indicates an identifier of the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

In step S520, the devices 1 and 3 transmit a connection establishment setup report message to the network. The connection establishment setup report message indicates information on devices to which the D2D connection establishment is targeted. The connection establishment setup report message may indicate that the device 2 is a target device of the D2D connection.

In step S530, the devices 1, 2, and 3 perform a resource request and allocation procedure for data transmission of the device 2. The D2D identifier transmitted through the c D2D broadcast configuration message may be used in resource allocation. If the resource allocation is complete between the devices 1 and 3 and the device 2, then the devices 1 and 3 receive traffic data from the device 2 in step S540.

Meanwhile, an additional D2D connection can be established between devices of which the D2D connection has already existed. For example, the additional D2D connection can be established between the devices when a QoS property is different from that of the existing D2D connection. In this case, information of each device for the additional D2D connection establishment may have already been acquired by the aforementioned D2D connection establishment procedure. Therefore, if information and/or parameters of each device for additional D2D connection establishment is set to the same as information and/or parameters of each device for the existing D2D connection establishment, messages and/or parameters included in the messages according to the embodiment of the present invention described above can be partially omitted.

Figure 8:
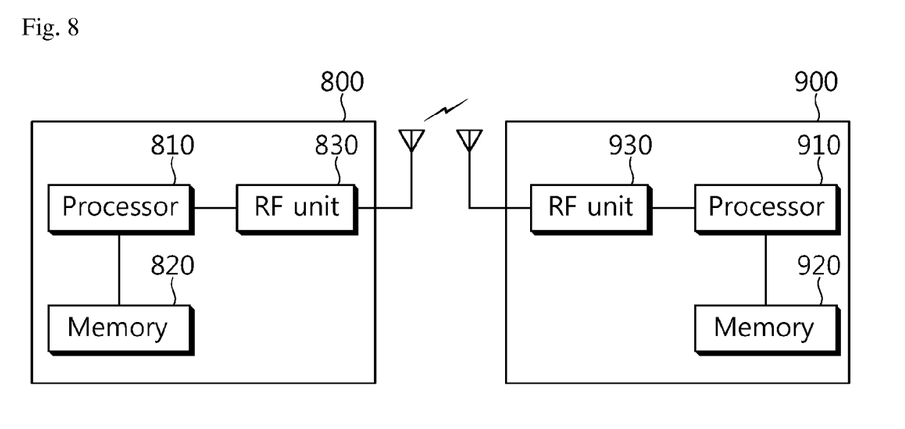
FIG. 8 is a block diagram showing wireless communication system to implement an embodiment of the present invention.

FIG. 8 is a block diagram showing wireless communication system to implement an embodiment of the present invention.

A first device 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing a device-to-device (D2D) connection in a wireless communication system, the method comprising:
   determining, by a network, whether to establish the D2D connection between a first device and a second device based on a proximity between the first device and the second device, a presence of data to be transmitted by the first device and the second device, and a preference for the D2D connection;
   transmitting, by a network, a connection establishment request message to request the D2D connection establishment to the first device and the second device, wherein the connection establishment request message includes a connection establishment type, a quality of service (QoS) parameter for the D2D connection, and security information;
   receiving, by a network, a connection establishment response message indicating whether to accept a request of the D2D connection establishment from the first device and the second device; and
   transmitting, by a network, a connection establishment confirm message to confirm the D2D connection establishment to the first device and the second device.

2. The method of claim 1, wherein the connection establishment request message further includes information on the first device and the second device, and a D2D identifier.

3. The method of claim 2, wherein the information on the first device and the second device includes identifiers of the first device and the second device.

4. The method of claim 2, wherein the D2D identifier is a link level D2D identifier allocated to a physical link between the first device and the second device.

5. The method of claim 2, wherein the D2D identifier is a connection/flow level D2D identifier allocated to a logical link between the first device and the second device.

6. The method of claim 1, wherein the connection establishment type indicates a 3-step D2D connection establishment procedure, wherein the 3-step D2D connection establishment procedure includes the step of transmitting the connection establishment request message to request the D2D connection establishment to the first device and the second device, the step of receiving the connection establishment response message indicating whether to accept the request of the D2D connection establishment from the first device and the second device, and the step of transmitting the connection establishment confirm message to confirm the D2D connection establishment to the first device and the second device.

7. The method of claim 1, wherein the connection establishment confirm message is transmitted to the first device and the second device in a unicast manner.

8. The method of claim 1, wherein the connection establishment confirm message is transmitted to the first device and the second device in a multicast manner using a D2D identifier.

9. The method of claim 1, further comprising transmitting a D2D broadcast configuration message not only to the first device and the second device but also to all neighbor devices, wherein the D2D broadcast configuration message includes information on the first device and the second device, and a D2D identifier.

10. The method of claim 9, wherein the D2D broadcast configuration message is transmitted in a broadcast manner.

11. A method for establishing a device-to-device (D2D) connection in a wireless communication system, the method comprising:
    determining, by a network, whether to establish the D2D connection between a plurality of source devices and a target device based on a proximity between the plurality of source devices and the target device, a presence of data to be transmitted by the plurality of source devices and the target device, and a preference for the D2D connection;
    transmitting, by a network, a D2D broadcast configuration message to request the D2D connection establishment to the plurality of source devices, wherein the D2D broadcast configuration message includes information on the plurality of source devices and the target device, D2D connection information pre-established for the target device, a quality of service (QoS) parameter for the D2D connection, security information, and a D2D identifier; and
    receiving, by a network, a connection establishment setup report message including information on the plurality of source devices and the target device from the plurality of source devices.

12. The method of claim 11, wherein the D2D broadcast configuration message is transmitted in a broadcast manner.

13. The method of claim 11, wherein the information on the plurality of source devices and the target device includes identifiers of the plurality of source devices and the target device.

* * * * *